March 31, 1953  B. F. W. HEYER  2,633,237
BATTERY SERVICE KIT AND CONTAINER THEREFOR
Filed Jan. 24, 1951
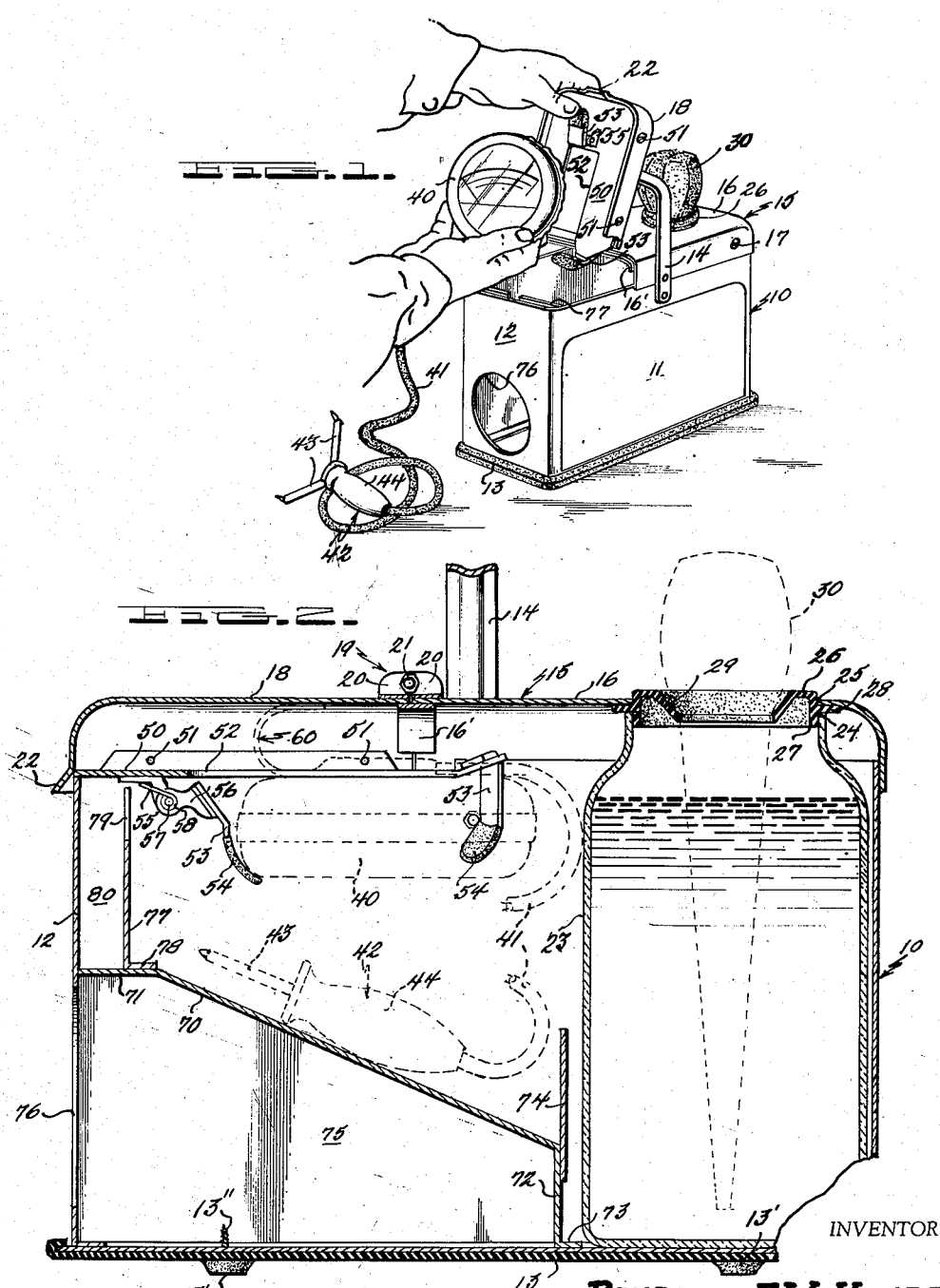
INVENTOR
BENJAMIN F. W. HEYER
BY
Semmes, Keegin, Robinson + Semmes
ATTORNEYS Patented Mar. 31, 1953

2,633,237

UNITED STATES PATENT OFFICE 2,633,237

BATTERY SERVICE KIT AND CONTAINER THEREFOR

Benjamin F. W. Heyer, Belleville, N. J.

Application January 24, 1951, Serial No. 207,552

1 Claim. (Cl. 206—16)

This invention relates to a battery service kit and has specific reference to a portable container for storing, transporting and protecting all of the necessary items for the proper servicing of vehicle batteries.

The container of the present invention is especially adapted for use with an open circuit voltage test meter having an elongated cord with a forked test prod at the end thereof. In addition to the test meter, it has been designed to carry in combination a water jar, tools for servicing of terminals of batteries, a self-leveling syringe, and a waterproof compartment for tickets or service slips. The entire base of the container is covered with a resilient material such as molded rubber to prevent damage to vehicle finishes when the container is placed on the surface of a vehicle. All the items within the container are protected from contact with each other and the test meter is carried in such fashion that battery tests may be made without removing the body of the meter from the container.

A primary object of the present invention is to provide a battery service kit which includes in one portable container, a refill jar, a filling syringe, an electric test meter and cord, and a complete set of battery service tools.

Another object of this invention is to provide a single portable battery service kit including a container for the items mentioned and in which the various items are separated from each other and protected from shock and damage during rough handling of the container.

Still another object of this invention is to provide a battery service kit of the character described including a container which has a base completely covered with resilient material so that damage to vehicle finishes is minimized.

Yet another object of this invention is to provide a test kit of the character described wherein a vehicle battery may be tested without removing the test meter from the container.

A further object of this invention is to provide a battery test kit of the character described wherein the test meter is suspended in shockproof position beneath a movable cover portion of the container and a movable clamp permits ready insertion and removal of the meter.

A still further object of this invention is to provide a test kit of the character described which is clean and makes battery servicing quick and accurate and in which all testing and servicing items are contained in one portable container.

With these and other objects and advantages in view, which will become more apparent during the course of the following description, the invention consists in the features and combinations hereinafter set forth.

In order to make the invention more fully understood, preferred embodiments thereof have been made the subject of illustration in the accompanying drawings in which:

Figure 1 is a perspective view of the battery service kit and container of this invention showing how the electric test meter is suspended beneath a hinged portion of the cover; and Figure 2 is a vertical cross section of the container of this invention.

In its briefest concept, the present invention embodies a battery service equipment container for storing and transporting in a single unit the following items: a refill jar and syringe therefor, a battery test meter with an extension cord and test prod, and battery servicing tools. The overall container is made of rigid material and has a handle and a rubber covered base. Part of the cover of the container is fixed to the container and has an aperture therethrough about which is a lining for positioning the mouth of the refill jar. The other part of the cover is hinged to the container and has clamp means for suspending the test meter beneath said hinged part. Panels within the container provide separate compartments for battery servicing tools and slips of paper. In the end of the container adjacent the tool compartment is an aperture which is left open for easy access to the tools carried by the container.

Referring to the drawings, Figure 1 shows the container 10 of this invention. This container is preferably made of sheet steel which is protected with acid-resisting enamel. The container has side walls 11 and end walls 12. Covering the base of the container is a continuous one piece molded rubber covering 13 having pads 13' thereon. This rubber covering 13 is screwed onto the base by screws 13'' passing up through the center of the pads 13'. A rigid handle 14 is provided for carrying the container and a cover generally designated as 15 closes the top of the container.

As shown in Figures 1 and 2, part of the cover 16 is fixed to the top of the container by screws 17. The other part of the cover 18 is cut away from the part 16 and hinged thereto by a hinge 19 consisting of two opposed brackets 20 and a set of pivot screws 21 at opposite ends of the hinge. A strip of sheet metal 16' is secured to the inside of the fixed part 16 of the cover along the cut-away edge thereof to reinforce said edge and to close the opening between the parts 16 and 18 when the part 18 is closed. A lip 22 is provided at the free end of the movable part 18 of the cover as a finger catch for raising the cover.

Carried within the container 10 and beneath the fixed part 16 of the cover is a glass, water filling jar 23 having an open top 24. In the preferred form, this jar has a capacity of two quarts of water. An aperture 25 is cut in the top of the part 16 of the cover, and a combination rubber gasket and filling orifice 26 is positioned to form a lining within the aperture 25. The gasket 26 has an inner flange 27 which extends vertically within the mouth of the jar 23 and a lateral flange 28 which extends between the top edge of the jar at the mouth 24 and the underside of the cover 16 to hold the jar in fixed position within the container and at the same time cushion it from shock due to rough handling. A tapered inner throat 29 is formed in the gasket 26. A leveling syringe 30 is seated, as shown by the dotted lines, within the throat 29 to form a waterproof and dustproof seal at the mouth of the filling jar.

Carried within the container is an open circuit voltage test meter 40 having an elongated cord 41 and a forked prod member 42 consisting of two opposed prongs 43 with an upper handle 44. Unique means are provided for carrying this test meter and its related parts so that the sensitive meter will not be damaged in rough handling of the test kit container and so that, if desired, battery tests may be made without removing the meter from the container. The meter is suspended within the container against a panel 50 which is attached by screws 51 to the hinged part 18 of the cover in spaced relation from the top surface of said cover as shown. This panel has a slot 52 extending from the inner edge thereof. For carrying and holding the meter 40 against the panel 50, a plurality of clamps 53 are provided. These clamps have rubber tips 54 for holding the meter in cushioned suspension. As shown, two of the clamps 53 are fixed to the free ends of the plate 50, which are bent up to provide a spring-like support for the clamps.

At the upper end of the slot 52, the clamp 53 is spring-loaded so that it may be moved in a direction away from the clamps at the other end of the panel for easy insertion and removal of the meter from the container. This spring-loaded construction of the clamp includes a bracket 55 which is secured to the panel 50 and a bracket 56 secured to the end of the clamp 53 with a pivot pin 57 joining the two brackets and a spring 58 forcing the clamp 53 in the direction of the pair of clamps at the other end of the panel 50. It will be noted that a hook shaped bracket 60 at the back of the meter 40 extends up through the slot 52 of the panel 50. This bracket 60 is provided so that the meter 40 may be hung up, if desired, on some other object.

Also beneath the hinged part 18 of the cover and spaced a considerable distance down inside of the container is an inclined panel 70 which has a horizontal portion 71 secured to the inside of the end wall 12 of the container and a vertical portion 72 with a flange 73 for supporting the inclined panel within the container. This inclined panel supports the prod 42 and the cord 41 extending from the meter 40. A guard plate 74 protects the glass jar 23 from objects resting on the upper surface of the inclined panel 70. Beneath the inclined panel 70 is formed a separate compartment 75 for accommodating battery servicing tools. An aperture 76 is cut into the side wall 12 of the container of sufficient size so that a man's hand may pass within the compartment 75. In this manner, tools may be readily inserted and removed from the compartment 75.

A vertical panel 77 is spaced from the end wall 12 above the portion 71 and provides a compartment 80 for slips of paper or service tickets, etc. This panel 77 has a lower horizontal flange 78 which is welded or otherwise secured to the portion 71 for maintaining the panel 77 in fixed position. A slot 79 is provided along the top edge of the panel 77 in the center thereof so that tickets may be easily removed from the compartment 80.

It will be noted that the container of this invention is handy and easy to carry. The meter and the water jar are cushioned against shock while carried within the container and are also protected against water and dirt when the container is closed. Because of the rubber covering 13, the container may be placed on any part of a vehicle, such as the fender, without scratching same. Though the test meter may be instantly removed by pressing the spring-loaded, rubber covered clamp 53, the meter may be retained in position beneath the hinged part of the cover when it is raised to the open position and the prod 42 placed across the cells of the battery so that a test may be obtained immediately after refilling the batteries with water which has been obtained from the container. In the final analysis, this service kit and container with its open circuit voltage test meter provides a clean, quick and accurate means of testing and servicing batteries.

It will be understood that various changes may be made such as in the size, shape and arrangement of parts or by the substitution of equivalents without departing from the spirit of the invention. Therefore, the invention is not limited to the form or uses shown, except to the extent indicated in the appended claim, which is to be interpreted as broadly as the state of the art will permit.

I claim:

In combination with a rigid, metal container for a battery test kit having side walls and a base, a handle, a one piece resilient covering for said base, a cover for said container, one part of said cover being fixed to the container, the other part being hinged to the said fixed part for opening thereon, an aperture defined in the top of the fixed part of the cover, a water jar beneath said aperture, a rubber lining about said aperture defining a flexible tapered throat, a filling syringe, said syringe engageable with the tapered throat of the rubber lining to form a water- and dirt-proof seal over the water jar, an electric test meter, an inner panel fixed to the said hinged part of the cover for carrying the electric test meter in shockproof suspension, said panel having a plurality of clamps thereon for engaging the meter, one of said clamps being spring loaded to enable ready insertion and removal of the test meter, a second panel dividing the container below the other part of the cover into vertically separated upper and lower compartments, the upper compartment containing the test meter and the lower compartment being for tools for servicing the battery, a partition blocking off the lower compartment from the water jar, an aperture defined in the side wall of the container adjacent the lower compartment for access to said tools and a vertical panel in the upper compartment spaced from the end wall to provide a space for papers.

BENJAMIN F. W. HEYER.

REFERENCES CITED

The following references are of record in the file of this patent:

UNITED STATES PATENTS

| Number | Name | Date |
|---|---|---|
| 1,026,264 | Hokanson | May 14, 1912 |
| 1,850,202 | Gerhardt | Mar. 22, 1932 |
| 1,933,894 | Clink | Nov. 7, 1933 |
| 2,205,495 | Schmitt | June 25, 1940 |
| 2,321,703 | Rivard | June 15, 1943 |
| 2,338,695 | Lingel | Jan. 4, 1944 |